United States Patent
Chen et al.

(10) Patent No.: US 8,638,492 B2
(45) Date of Patent: Jan. 28, 2014

(54) DISPLAY CELL, DISPLAY APPARATUS AND METHOD FOR MAKING SAME

(75) Inventors: Jau Shiu Chen, Taipei (TW); Rong Chang Liang, Cupertino, CA (US); Ming Wei Tsai, Chiayi (TW)

(73) Assignee: Delta Electronics, Inc., Taoyuan County (TW)

( * ) Notice: Subject to any disclaimer, the term of this patent is extended or adjusted under 35 U.S.C. 154(b) by 217 days.

(21) Appl. No.: 12/930,485

(22) Filed: Jan. 7, 2011

(65) Prior Publication Data
US 2011/0169019 A1 Jul. 14, 2011

Related U.S. Application Data (60) Provisional application No. 61/335,935, filed on Jan. 12, 2010.

(51) Int. Cl.
*G02B 26/00* (2006.01)

(52) U.S. Cl.
USPC ............................................. 359/296

(58) Field of Classification Search
USPC .................. 345/49, 105, 107; 430/32, 34, 38; 359/900, 290–299
See application file for complete search history.

(56) References Cited

U.S. PATENT DOCUMENTS

| | | | |
|---|---|---|---|
| 7,436,578 B2 * | 10/2008 | Lee et al. ...................... 359/296 |
| 2007/0182706 A1 * | 8/2007 | Cassidy et al. ................ 345/107 |
| 2008/0111131 A1 * | 5/2008 | Yang .............................. 257/40 |
| 2009/0224246 A1 * | 9/2009 | Hwang et al. .................. 257/59 |

* cited by examiner

*Primary Examiner* — Scott J Sugarman
*Assistant Examiner* — Vipin Patel (57) ABSTRACT

In an electrophoretic display device comprising a plurality of pixels, each pixel having a cell area containing a plurality of charged pigment particles dispersed between two opposite electrodes, a semiconducting passivation layer is provided on one or both of the two opposite electrodes. The semiconducting passivation layer can be made of $MO_{x/y}$, $MS_{x/y}$, or $MN_{x/y}$ where M is a metal or semiconductor such as Al, Sn, Zn, Si, Ge, Ni, Ti or Cd; x is a positive integer; and y is independently a non-zero positive integer. The semiconducting passivation layer may have a doped Si, $ZnO_{x/y}$, $ZnS_{x/y}$, $CdS_{x/y}$ and $TiO_{x/y}$ or a III-V type semiconducting material. The semiconducting passivation layer can be doped with a dopant which can be an n-type doner or a p-type acceptor, the n-type doner is N, P, As or F; and the p-type acceptor is B, Al, Ga, In, Be, Mg or Ca.

20 Claims, 8 Drawing Sheets

DISPLAY CELL, DISPLAY APPARATUS AND METHOD FOR MAKING SAME

This application is based on and claims priority to a U.S. provisional application Ser. No. 61/335,935, filed on Jan. 12, 2010.

FIELD OF THE INVENTION

The present invention relates to a display cell, and more particularly to a display cell in a display apparatus or panel using an electronic paper technology.

BACKGROUND OF THE INVENTION

Figure 1A:
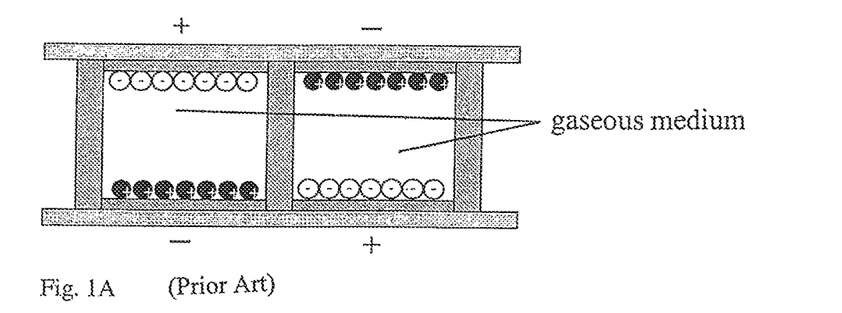
FIG. 1A shows a typical powder type of electrophoretic display in a gaseous medium in the display cells.
Figure 1B:
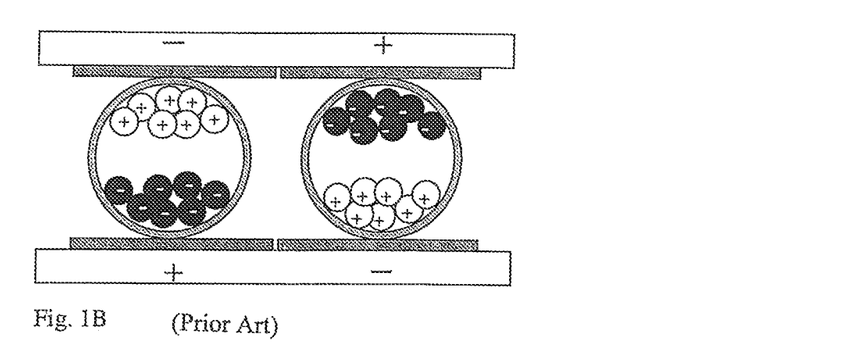
FIG. 1B shows a typical microcapsule type of electrophoretic display comprising particles of different polarities and contrast colors.
Figure 1C:
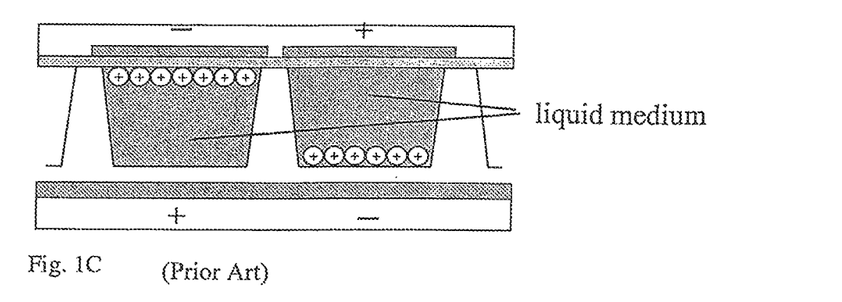
FIG. 1C shows a typical microcup type of electrophoretic display comprising charged particles dispersed in a contrast-colored fluid.

Electronic paper (E-paper) is a display technology designed to mimic the appearance of ordinary ink on paper. A particle-based display, such as an electrophoretic display, is widely used in E-papers. Particle-based displays comprise a plurality of independently addressable display cells arranged in an array, wherein each display cell comprises a plurality of pigment particles that are held between a pair of opposing, spaced-apart electrodes. An electrophoretic display can be a powder type display in which particles of different polarities and contrast colors are suspended in a gaseous medium in the display cells as shown in FIG. 1A. An electrophoretic display can be a microcapsule type display in which particles of different polarities and contrast colors are enclosed in a plurality of microcapsules as shown in FIG. 1B. An electrophoretic display can also be a microcup type display in which charged particles are dispersed in a contrast-colored fluid as shown in FIG. 1C.

In a display apparatus operated in the in-plane switching mode, both electrodes are on the same plane or substrate. In a display apparatus operated in the top-down switching mode, the two electrodes are on different (top and bottom) substrates. In all cases, at least one of the two substrates is transparent so that the state of the particles can be viewed through the transparent substrate. When a voltage difference or an electrical field is imposed between the first and second electrodes, the pigment particles migrate to the electrode which has opposite polarity to the pigment particles. Thus, changes in the color or shade displayed through the transparent electrode are facilitated by selectively changing the polarities of the electrodes.

When the pigment particles migrate to and contact the electrode with the polarity opposite to the pigment particles, electrons may gradually leak through the contact surface even after the power is turned off. Thus, the longer the particles contact the electrode, the less charge density (charge per unit weight, Q/W) remains on the particle surface and the more difficult it is to re-drive the pigment particles by electric field.

SUMMARY OF THE INVENTION

In summary, the first aspect of the present invention is directed to the use of a semiconducting passivation layer on at least one of the electrodes of a charged particle-type display panel or EPD. The semiconducting passivation layer can be made of $MO_{x/y}$, $MS_{x/y}$, or $MN_{x/y}$, wherein M is a metal or semiconductor such as Al, Sn, Zn, Si, Ge, Ni, Ti, Cd; x is a positive integer such as 0, 1, 2 . . . , and y is independently a non-zero positive integer such as 1, 2, 3 . . . . Examples of the materials for the semiconducting passivation layer include, but are not limited to $AlO_{x/y}$, $SnO_{x/y}$, $ZnO_{x/y}$, $AlN_{x/y}$, $SiN_{x/y}$, $ZnS_{x/y}$, $NiO_{x/y}$, $CdS_{x/y}$, $TiO_{x/y}$ and the combinations thereof. The semiconducting passivation layer may be further doped with an electron deficient atom to form a p-type semiconducting passivation layer or doped with a electron donating atom to form an n-type passivation semiconducting layer. Alternatively, the semiconducting passivation layer can be made of doped Si or III-V types of semiconducting layer. Preferably the semiconducting layer is made of a doped $ZnO_{x/y}$, $ZnS_{x/y}$, $CdS_{x/y}$, or $TiO_{x/y}$. The dopants characteristic for semiconductor passivation layer can be n-type doners such as N, P, As, F, . . . ; or p-type acceptors, such as B, Al, Ga, In, Be, Mg, Ca . . . . Still alternatively, the semiconducting passivation layer may be made of one or more organic p-type materials such as: Poly(3-hexylthiophene), Tris-(9,9dimethylfluorene), 3-(2-Benzothiazolyl)-7-(diethylamino)coumarin, Triphenylamine, Phthalocyanine, Copper complex, CuPc. The semiconducting layer may be deposited onto the electrode by a thin film deposition process such as sputtering, vapor deposition, or by wet coating of a solution or dispersion of the semiconducting material.

The second aspect of the present invention is directed to a charged particle-type display or EPD comprising an electrode coated with a semiconducting passivation layer. In one embodiment of the present invention, all the electrodes are coated with a semiconducting passivation layer. The display may be an AMEPD, an S-EPD or a PMEPD.

The third aspect of the present invention is directed to a PMEPD wherein one of the opposing electrodes in a pixel is coated with a p-type semiconducting layer and the other is coated with an n-type semiconducting layer.

The fourth aspect of the present invention is directed to an AMEPD having a plurality of pixels, each pixel comprising a common electrode and a pixel electrode, wherein one of the electrodes is coated with a p-type semiconducting passivation layer and the other is coated with an n-type semiconducting passivation layer.

The fifth aspect of the present invention is directed to an S-EPD having a plurality of pixels, each pixel comprising a common electrode and a segment electrode, wherein one of the electrodes is coated with a p-type semiconducting passivation layer and the other is coated with an n-type semiconducting passivation layer.

In various embodiments of the present invention, the thickness of the semiconducting passivation layer can be less than about 0.1 um to about 5 um, depending on the driving voltage and the materials used. The semiconducting passivation layer should be thin enough to allow an efficient particle charge drain through the layer.

In various embodiments of the present invention, an additional protective layer may be provided over the semiconducting passivation layer to enhance the durability or life-time of the EPDs. The protective layer may comprise a thin film made of $SiO_{x/y}$, $SiN_{x/y}$, $AlO_{x/y}$ or $AlN_{x/y}$ and the like, wherein the definitions of x and y are the same as before described. In one embodiment of the present invention, the thickness of the protective layer is smaller than that of the underlying semiconducting passivation layer.

According to various embodiments of the present invention, the charged pigment particles may be dispersed in a dielectric liquid medium or suspended in a gaseous medium and may be enclosed in micro-grids, microcups or microcapsules. The dielectric liquid medium comprises water, oil, alcohol or the like.

According to various embodiments of the present invention, the semiconducting passivation layer can be made of one or more inorganic materials.

According to various embodiments of the present invention, the semiconducting passivation layer can be made of one or more organic p-type materials such as: Poly(3-hexylthiophene), Tris-(9,9dimethylfluorene), 3-(2-Benzothiazolyl)-7-(diethylamino)coumarin, Triphenylamine, Phthalocyanine, Copper complex, CuPc.

According to various embodiments of the present invention, the semiconducting passivation layer can be made of one or more organic n-type materials such as: Pentacene; Antra[2",1",9";4,5,6,6",5",10";4',5',6']diisoquino[2,1a;2',1'a']diperimidine12,25-dione 3,4,9,10-perylenetetracarboxylic dianhydride (PTCDA); (6,6)-phenyl-C61butyric acid methyl ester; N,N-Bis(2,5ditertbutylphenyl)3,4,9,10-perylenedicarboximide.

DETAILED DESCRIPTION OF THE INVENTION

The present invention provides a method for improving the performance of an electrophoretic display (EPD) in which the charged pigment particles may be dispersed in a dielectric liquid or suspended in air.

Figure 2A:
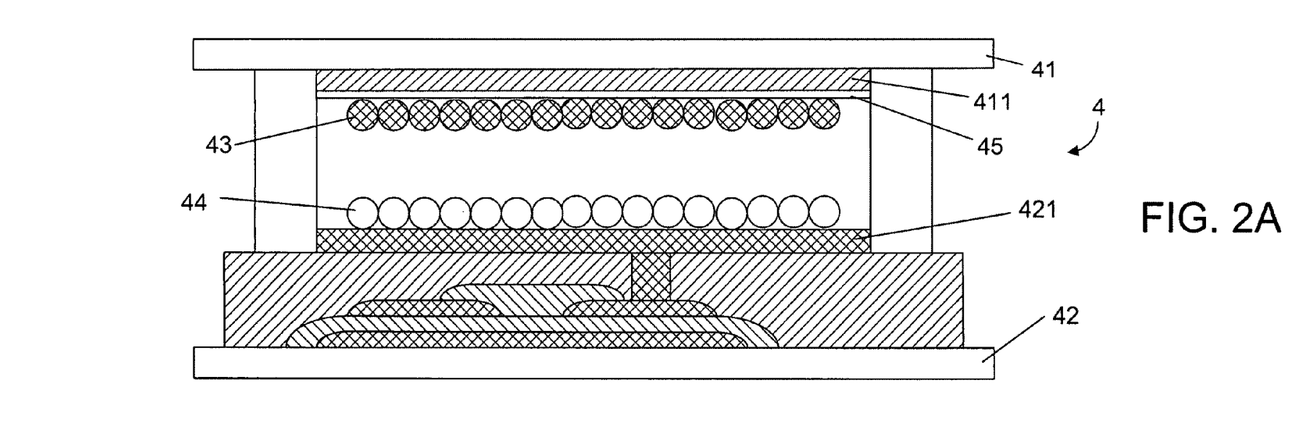
FIG. 2A shows an active-matrix EPD with a semiconducting passivation layer on the common electrode, according to an embodiment of the present invention.

In one embodiment of the present invention as shown in FIG. 2A, the common electrode layer 411 on the top substrate 41 of a display 4, such as an active matrix electrophoretic display (AMEPD) or a segment electrophoretic display (S-EPD), is coated with a semiconducting passivation layer 45 such that the charged pigment particles 43 are attracted toward the top substrate 41 in response to a voltage between the common electrode layer 411 and the pixel electrodes 421 which is disposed on the bottom substrate 42. At the same time, the differently charged particles 44 remain in contact with the electrode 421. As shown in FIG. 2A, the charged particles 43 are in contact with the semiconducting passivation layer 45, instead of the surface of the common electrode 411.

Figure 2B:
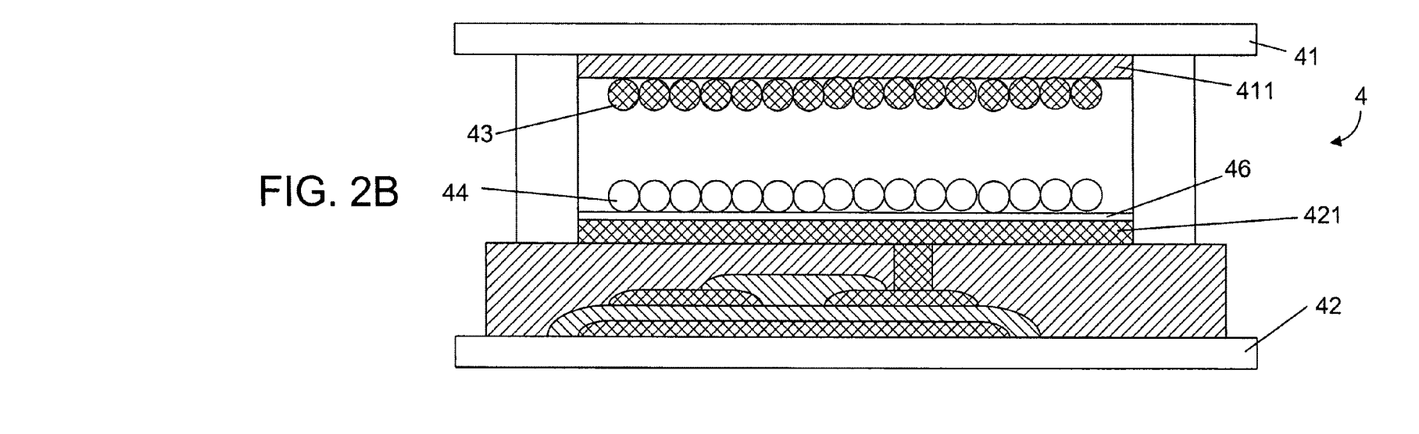
FIG. 2B shows an active-matrix EPD with a semiconducting passivation layer on the pixel electrode, according to another embodiment of the present invention
Figure 2C:
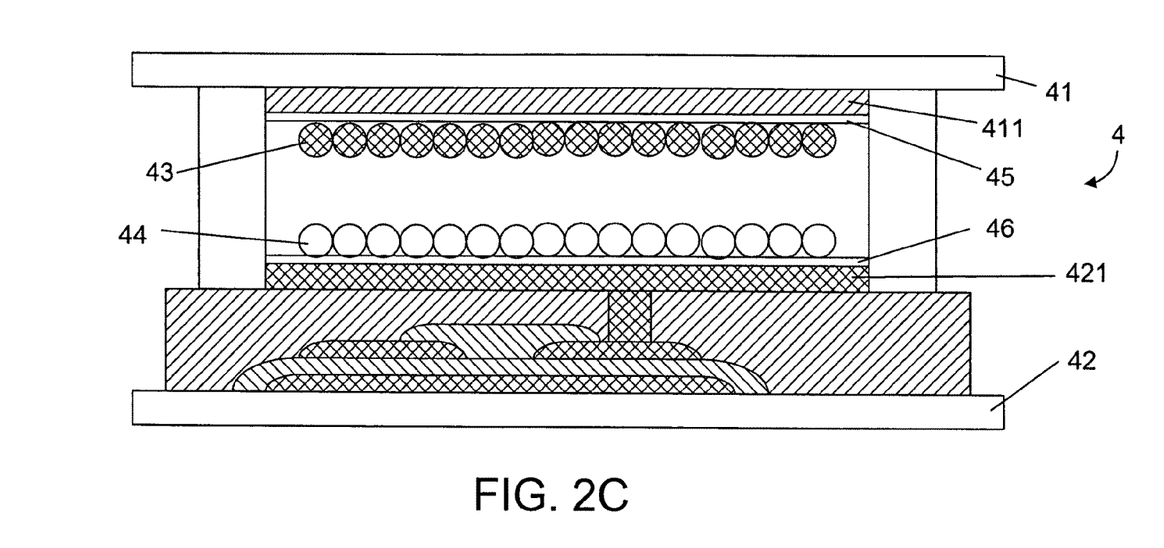
FIG. 2C shows an active-matrix EPD with a semiconducting passivation layer on both the common electrode and the pixel electrode.

In another embodiment of the present invention as shown in FIG. 2B, at least some of the pixel electrodes 421 on the bottom substrate 42 of the display 4, which is an AMEPD or S-EPD as mentioned above, are coated with a semiconducting passivation layer 46 so that when the charged pigment particles 44, attracted toward the pixel electrodes 421, are in contact with the semiconducting passivation layer 46, instead of the pixel electrodes 421. In one embodiment of the present invention, all of the pixel electrodes 421 of an AMEPD or S-EPD are coated with a semiconducting passivation layer 46. In still another embodiment of the present invention, the common electrode 411 on the top substrate 41 and at least some of the pixel electrodes 421 on the bottom substrate 42 are coated with a semiconducting passivation layer 45, 46 as shown in FIG. 2C.

Figure 3A:
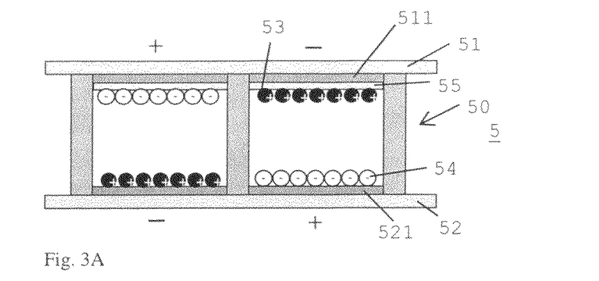
FIG. 3A shows a passive-matrix EPD with a semiconducting passivation layer on the row electrodes, according to an embodiment of the present invention.
Figure 3B:
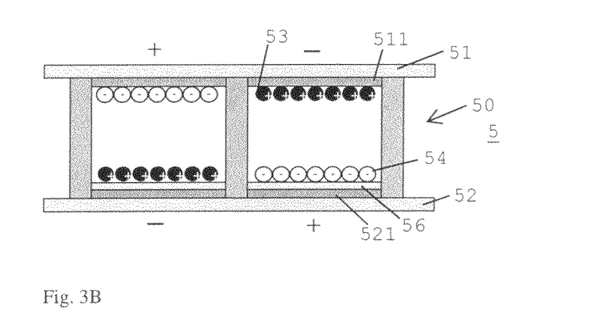
FIG. 3B shows a passive-matrix EPD with a semiconducting passivation layer on the column electrodes, according to another embodiment of the present invention
Figure 3C:
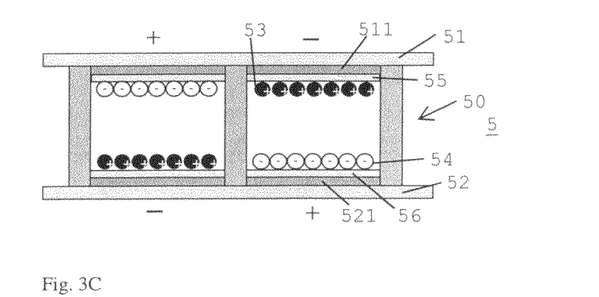
FIG. 3C shows a passive-matrix EPD with a semiconducting passivation layer on both the row and the column electrodes.
Figure 4A:
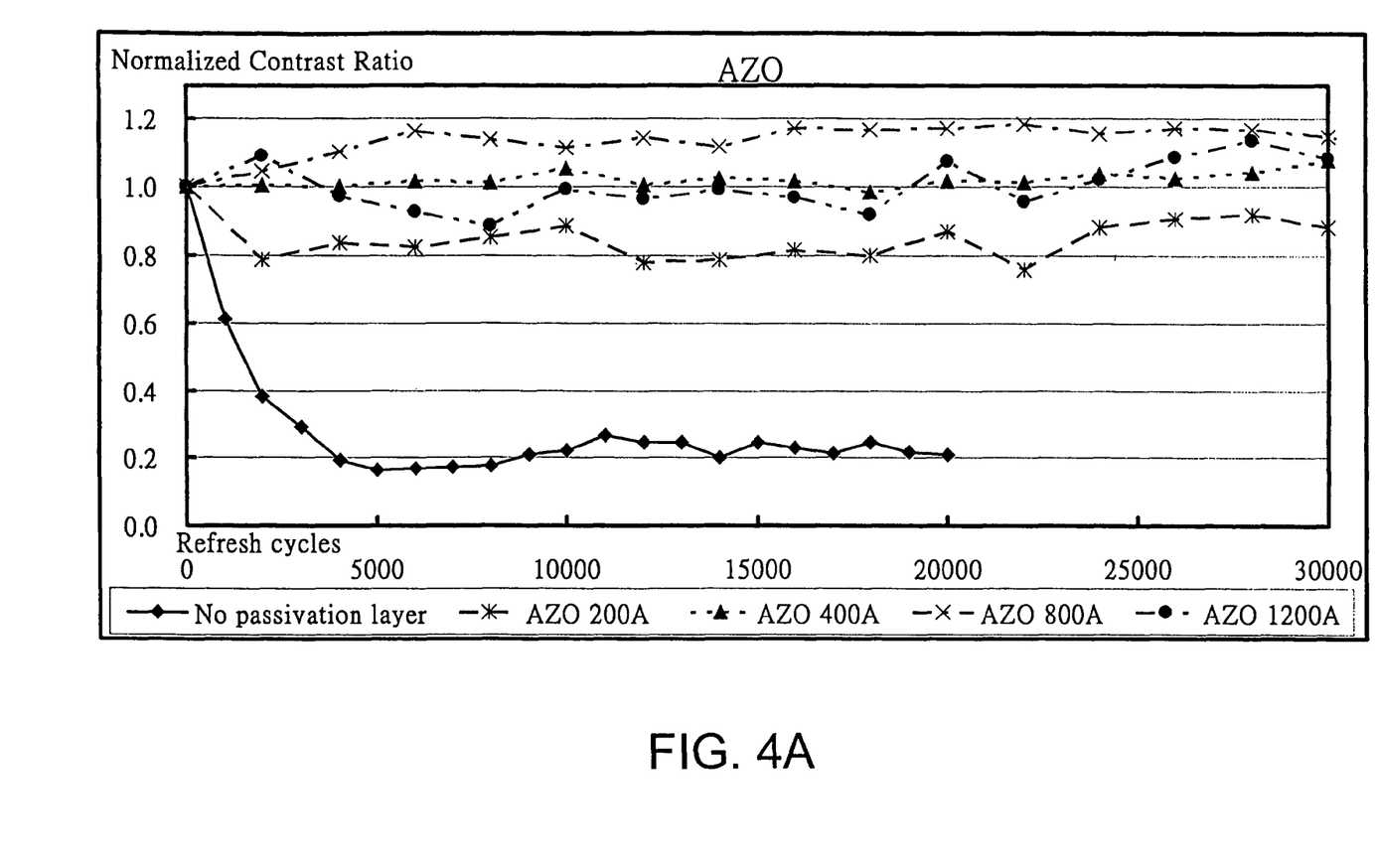
FIG. 4A is a chart showing a refresh cycles-to-normalized contrast ratio for a passive-matrix EPD with a semiconducting passivation layer (AZO) due to different thickness.
Figure 4B:
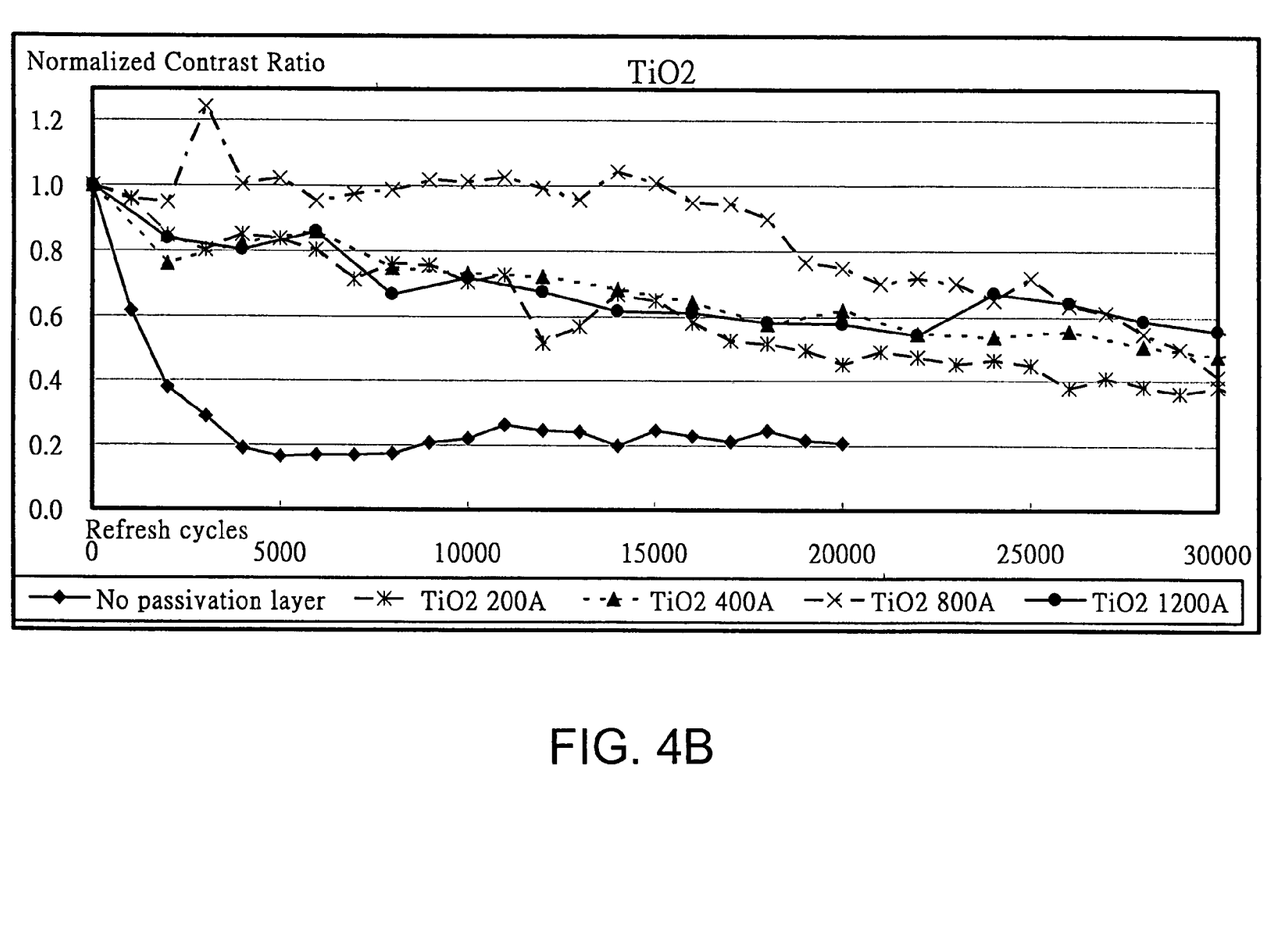
FIG. 4B is a chart showing a refresh cycles-to-normalized contrast ratio for a passive-matrix EPD with a semiconducting passivation layer ($TiO_2$) due to different thickness.
Figure 4C:
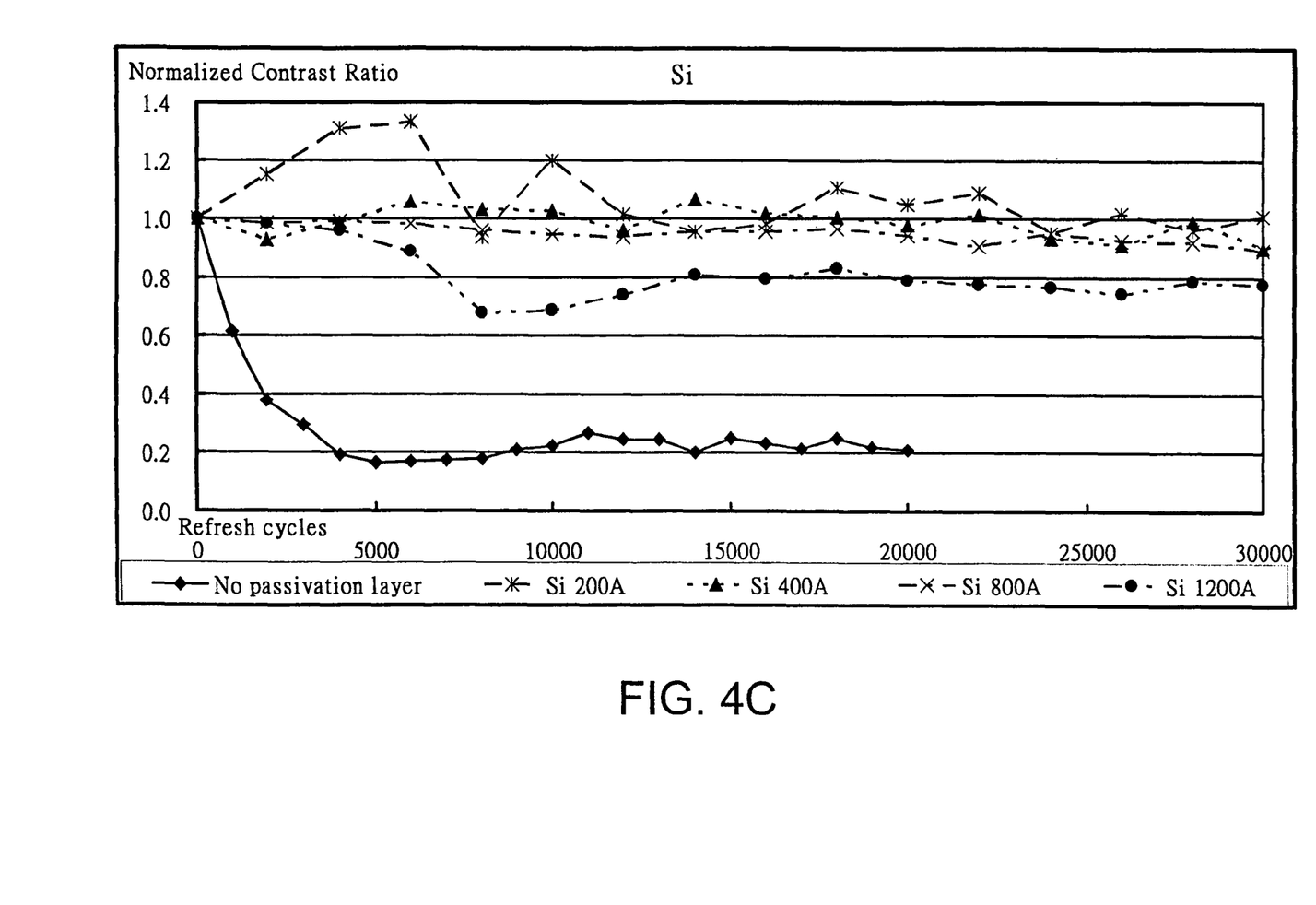
FIG. 4C is a chart showing a refresh cycles-to-normalized contrast ratio for a passive-matrix EPD with a semiconducting passivation layer (Si) due to different thickness.
Figure 4D:
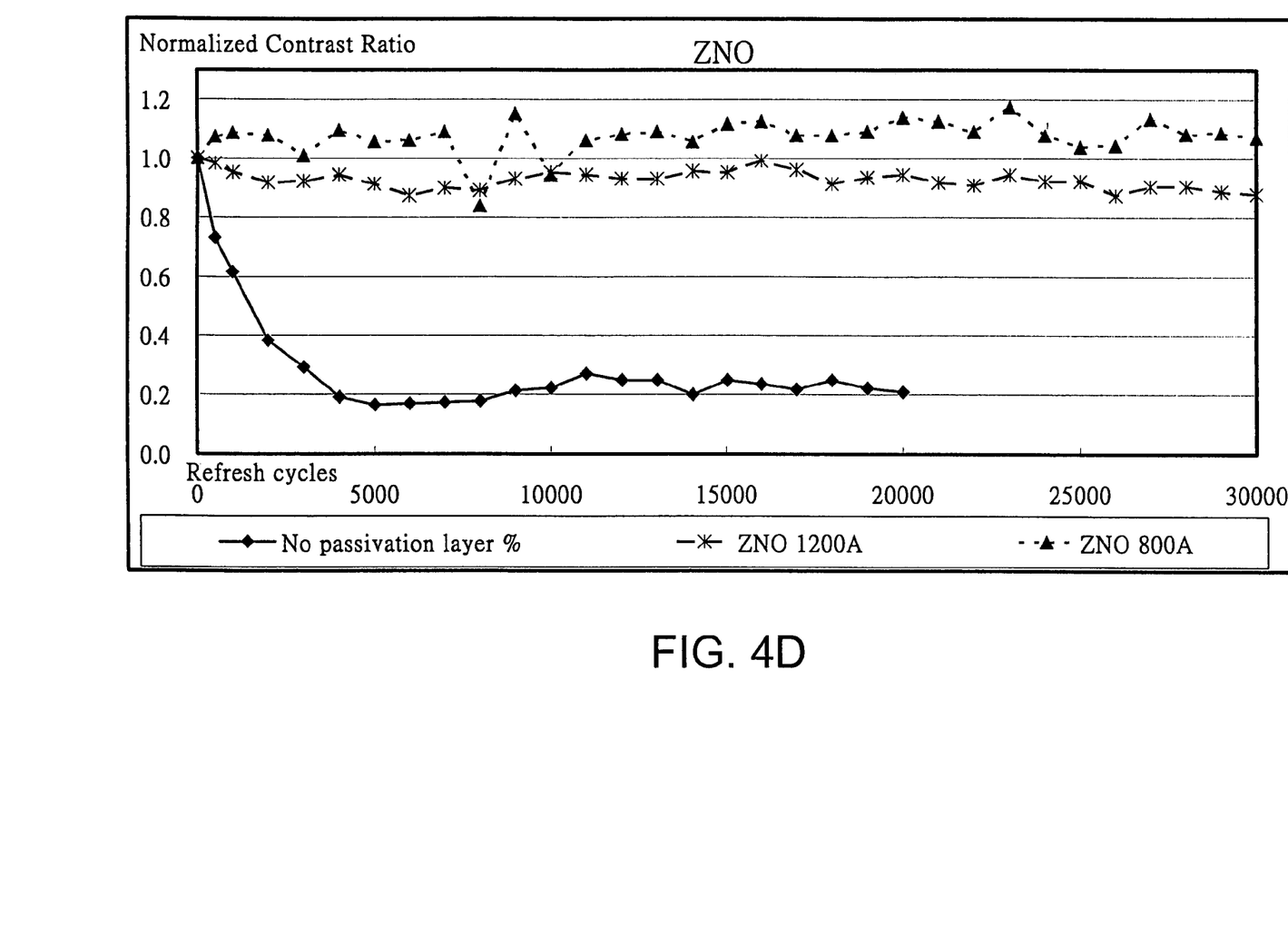
FIG. 4D is a chart showing a refresh cycles to normalized contrast ratio for a passive-matrix EPD with a semiconducting passivation layer (ZnO) due to different thickness.

In still another embodiment of the present invention as shown in FIGS. 3A and 3B, at least some of the row or column electrodes 51, 52 of a display 5, such as a passive matrix electrophoretic display (PMEPD), are coated with a semiconducting passivation layer 55, 56. In one embodiment of the present invention, as shown in FIG. 3C, all of the row and column electrodes 51 and 52 of a display, a PMEPD as mentioned, are coated with a semiconducting passivation layer 55 and 56. As shown in FIG. 3A, only the electrode 511 is coated with a semiconducting passivation layer 55 so that the charged pigment particles 53 are in contact with the semiconducting passivation layer 55, instead of the electrode 511. As shown in FIG. 3B, only the electrode 521 is coated with a semiconducting passivation layer 56 so that the charged pigment particles 54 are in contact with the semiconducting passivation layer 56, instead of the electrode 521. As shown in FIG. 3C, the electrode 511 is coated with a semiconducting passivation layer 55 and the electrode 521 is coated with a semiconducting passivation layer 56.

According to various embodiments of the present invention, the semiconducting passivation layer comprises a semiconducting material such as $MO_{x/y}$, $MS_{x/y}$, or $MN_{x/y}$, wherein M is a metal or semiconductor such as Al, Sn, Zn, Si, Ge, Ni, Ti, Cd; x is an integer such as 0, 1, 2, . . . ; and y is independently a non-zero integer such as 1, 2, 3, . . . . In general, the semiconducting passivation layer comprises oxides or sub-oxides or sulfide of Al, Sn, Zn, Si, Ge, Ni, Cd and Ti, or the nitrides of Al and Si. The semiconducting passivation layer may be further doped with an electron-deficient atom to form a p-type semiconducting passivation layer, or doped with an electron-donating atom to form an n-type semiconducting passivation layer. Alternatively, the semiconducting passivation layer comprises doped Si or III-V types of semiconducting passivation layer. In some embodiments of the present invention, the semiconducting passivation layer comprises a doped $ZnO_{x/y}$, $ZnS_{x/y}$, $CdS_{x/y}$, or $TiO_{x/y}$, wherein the definition of x and y are the same as before described. Still alternatively, the semiconducting passivation layer may be made of one or more organic p-type materials such as: Poly(3-hexylthiophene), Tris-(9,9dimethylfluorene), 3-(2-Benzothiazolyl)-7-(diethylamino)coumarin, Triphenylamine, Phthalocyanine, Copper complex, CuPc. Still alternatively, the semiconducting passivation layer may be deposited onto the electrode by a thin film deposition process such as sputtering, vapor deposition, or by wet coating of a solution or dispersion of the semiconducting material.

Electrophoretic displays rely on the relocation of charged pigment particles to achieve an image change. Particles with suitable colors and charge polarities are dispersed between opposite electrodes and driven by an electric field, optionally with an additional magnetic field. By controlling the electric field, it is possible to achieve a color image or a black-and-white image. Depending on the driving voltage and the materials used for the semiconducting passivation layer, the thickness of the semiconducting passivation layer can be as thin as 0.1 um or less or as thick as 0.5 um. In any case, the semiconducting passivation layer should be thin enough to allow the particle charge to drain through the layer efficiently.

It should be noted that charges may be trapped at the surface of the pigment particles and the charge density has a strong relationship with the surface characteristics of the pigment particles and the interactions with the electrodes. In the powder type of EPD, the charge density may be increased or stabilized by triboelectric interactions among the pigment particles or by using suitable charge controlling agents. However, the charges may be dissipated or leaked through the electrodes of opposite electric field directions, particularly if the particles are allowed to stay in contact with the electrodes for a long time. As the result, particles aged on the electrodes tend to be more difficult to be driven by a given applied voltage because of the charge dissipation or leakage. As predicted by the DLVO (Derjaguin, Landau, Verwey and Overbeek) theory, particles of low charge density also tend to aggregate or flocculate through a secondary potential minimum because the van der Waals force may become the prevailing particle-particle interaction, as compared to the Columbic repulsion. Both the reduction of charge density and the particle aggregation or flocculation result in an increase of the driving voltage or time needed to reach a given contrast ratio. In some cases, they also result in changes in threshold voltage and operation temperature latitude and consequently cause difficulties in image modulation, and image stickiness or ghost images.

One of the functions of semiconducting passivation layer, according to the present invention, is to prevent the deterioration of the electrodes due to the interaction between the charged pigment particles and the electrodes. The semiconducting passivation layer may reduce the variation in the charge quantity on the charged pigment particles. It allows the charge leakage through the electrode(s) in a controlled way so that the bistability and the stability of threshold voltage may be maintained while the reverse bias may be reduced significantly. The semiconducting passivation layer serves as a potential barrier for providing a high potential barrier resistance at the metal/semiconductor interface under the thermal equilibrium. The potential barrier width can be expressed as $$\chi_d = \left(\frac{2\varepsilon_s \phi_i}{qN_d}\right)^{1/2}$$

where $\varepsilon_s$ is the dielectric constant of semiconductor; $\phi_i$ is the built-in potential of metal/semiconductor; $N_d$ is the doping concentration of semiconductor and q is the electric charge. The potential barrier width $\chi_d$, according to the present invention, can be adjusted by selecting the material of the semiconducting passivation layer and/or controlling the doping concentration. The dopants characteristic for semiconductor passivation layer can be n-type doners such as N, P, As, F, . . . or the like. The dopants can also be p-type acceptors, such as B, Al, Ga, In, Be, Mg, Ca . . . . By designing a suitable potential barrier width, the charge leakage of charged pigment particles may be modulated via the quantum tunneling effect. The charge transmission coefficient, T, of tunneling through a potential barrier can be also simplified as $$T \propto e^{-2k_1 \chi_d}$$

where $\kappa_1$ is a wave vector.

Since the potential barrier width between the metal/semiconductor and the statically charged particles with ohmic contact has a relationship with the doping concentration, the leakage current in thermal equilibrium and the operation current by forward or reverse bias can be controlled by the doping concentration. According to the present invention, the contact time delay of particle on the electrode is also taken into consideration when generating the driving waveform for recharging.

In thermal equilibrium, charged particles are partially neutralized by carriers generated from electron-hole pairs in the electrical field of depletion region or quantum tunneling effect. As such, the attractive force occurs between charged pigment particles with opposite polarities in the electrophoretic display cells, thereby increasing the image stability of the electrophoretic display panel. The electrical potential in the depletion region has a relationship with work function of the materials. Therefore, the semiconducting passivation layer causes the charged pigment particles to become more attractive to the electrodes because of a smaller charge leakage. Also, particles with a smaller charge leakage can result in a smaller reverse bias when the applied voltage is turned off. These characteristics can be used to reduce the image sticking problem in an electrophoretic display and to lower the electric field between charged particles with opposite polarities when the displayed image is in an idle state.

The semiconducting passivation layer disposed on the electrodes may improve the retention model of electrostatic charges on the charged pigment particles. By isolating the attracting electrode from the charged pigment particles, the operational life span of the display and the performance of the display can be improved. One of the advantages of using a semiconducting passivation layer is that the semiconducting passivation layer can be implemented in all types of EPDs including PMEPD, AMEPD and S-EPD. FIGS. 2A-2C show an embodiment of the AMEPD with a semiconducting passivation layer, where the semiconducting passivation layer is provided on the common electrode (FIG. 2A); the pixel electrode (FIG. 2B); and both electrodes (FIG. 2C). FIGS. 3A-3C show an embodiment of the PMEPD with a semiconducting passivation layer, where the semiconducting layer is provided on the row electrode (FIG. 3A); the column electrode (FIG. 3B); and both the row and column electrodes (FIG. 3C).

In order to show how a semiconducting passivation layer can improve the performance of an electrophoretic display, the refresh cycles-to-normalized contrast ratio has been measured on a passive-matrix EPD with various semiconducting passivation layers (AZO, $TiO_2$, Si and ZnO) of different thicknesses. In each of FIGS. 4A to 4D, the normalized contrast ratio is plotted against the refresh cycles. As can be seen in FIGS. 4A to 4D, the normalized contrast ratio tends to drop rapidly with refreshed cycles when the semiconducting passivation layer is not used. In contrast, when the electrodes on the passive-matrix EPD are coated with a semiconducting passivation layer, the normalized contrast ratio tends to drop much slower.

Figure 5:
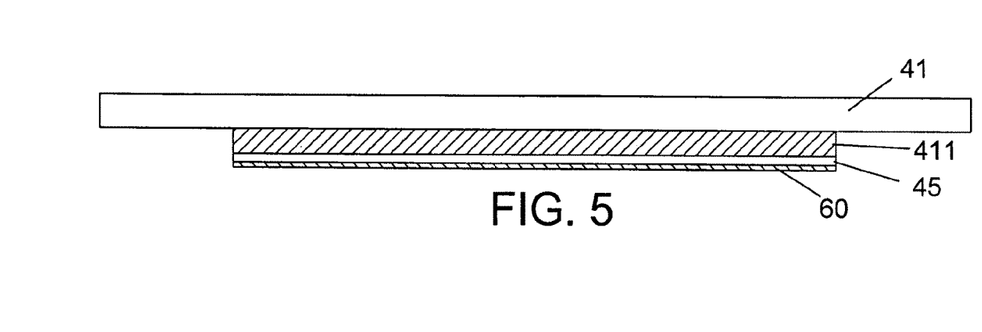
FIG. 5 shows an embodiment of the present invention wherein the semiconducting passivation layer is coated with a protective layer made of an insulating material.

In one of the embodiments of the present invention, the semiconducting passivation layer 45 (46, 55 or 56) is further coated with a protective layer 60, as shown in FIG. 5. The protective layer can be made of an insulating material, such as $SiO_{x/y}$, $SiN_{x/y}$, $AlO_{x/y}$, $AlN_{x/y}$, or the like, where x is a positive integer; and y is independently a non-zero positive integer.

What is claimed is:

1. A method, comprising:
providing a semiconducting passivation layer in an electrophoretic display, the electrophoretic display comprising a plurality of pixels, each pixel comprising a cell area containing a plurality of charged pigment particles, wherein the electrophoretic display comprises two opposite electrodes configured to generate an electric field—for controlling the charged pigment particles in the pixel, and wherein the semiconducting passivation layer is provided between electrode and cell area on at least one of the two opposite electrodes, the semiconducting passivation layer configured as a potential barrier between the charged pigment particles and said at least one of the two opposite electrodes.

2. The method according to claim 1, further comprising:
providing a further semiconducting passivation layer on another of the two opposite electrodes.

3. The method according to claim 1, wherein the semiconducting passivation layer is deposited onto the electrode by a thin film deposition process or by wet coating of a solution or dispersion of a semiconducting material.

4. An electrophoretic display device, comprising:
a plurality of pixels, each pixel comprising:
a cell area containing a plurality of charged pigment particles;
two opposite electrodes configured to generate an electric field for controlling the charged pigment particles in the pixel; and
a semiconducting passivation layer disposed between electrode and cell area on at least one of the two opposite electrodes, the semiconducting passivation layer configured as a potential barrier between the charged pigment particles and said at least one of the two opposite electrodes.

5. The display device according to claim 4, wherein each pixel further comprises a further semiconducting passivation layer disposed on another of the two opposite electrode.

6. The display device according to claim 5, wherein the semiconducting passivation layer disposed on said one of the opposite electrodes comprises a p-type semiconducting passivation layer and the further semiconducting passivation layer disposed on the other electrode comprises an n-type semiconducting passivation layer.

7. The display device according to claim 4, wherein the semiconducting passivation layer comprises one or more of $MO_{x/y}$, $MS_{x/y}$, and $MN_{x/y}$, wherein M is a metal or semiconductor such as Al, Sn, Zn, Si, Ge, Ni, Ti or Cd; x is a positive integer; and y is independently a non-zero positive integer.

8. The display device according to claim 7, wherein the semiconducting passivation layer is doped with a dopant, wherein the dopant comprises an n-type a (loner or a p-type acceptor, wherein the n-type doner is N, P, As or F; and the p-type acceptor is B, Al, Ga, Be, Mg, or Ca.

9. The display device according to claim 4, wherein the semiconducting passivation layer comprises a doped Si, $ZnO_{x/y}$, $CdS_{x/y}$, and $TiO_{x/y}$ or a III-V type semiconducting material, wherein x is a positive integer; and y is independently a non-zero positive integer.

10. The display device according to claim 4, wherein the electrophoretic display device comprises a passive-matrix electrophoretic display, an active-matrix electrophoretic display or a segment-electrophoretic display.

11. The display device according to claim 4, wherein the semiconducting passivation layer serves as a potential barrier for providing a high potential barrier resistance, wherein the potential barrier width is expressed as $$\chi_d = \left(\frac{2\varepsilon_s \phi_i}{qN_d}\right)^{1/2}$$

where $\varepsilon_s$ is a dielectric constant of semiconductor; $\phi_i$ is a built-in potential of metal/semiconductor; $N_d$ is a doping concentration of semiconductor and q is an electric charge, and the potential barrier width $\chi_d$ is adjusted by selecting a material of the semiconducting passivation layer and/or controlling a doping concentration.

12. The display device according to claim 4, wherein the semiconducting passivation layer is further coated with a protective layer, wherein the protective layer comprises one or more of $SiO_{x/y}$, $SiN_{x/y}$, $AlO_{x/y}$, and $AlN_{x/y}$ wherein x is a positive integer; and y is independently a non-zero positive integer.

13. The display device according to claim 4, wherein the semiconducting passivation layer comprises a thickness equal to or less than 5 μm.

14. The display device according to claim 4, wherein the semiconducting passivation layer comprises a thickness equal to or less than 0.5 μm.

15. The display device according to claim 4, wherein the charged pigment particles are dispersed in a liquid medium or suspended in a gaseous medium.

16. The display device according to claim 4, wherein the charged pigment particles are enclosed in micro-grids, micro-cups or microcapsules.

17. The display device according to claim 4, wherein the semiconducting passivation is made of one or more organic materials.

18. The display device according to claim 17, wherein the organic materials are selected from the group consisting of Poly(3-hexylthiophene), Tris-(9,9dimethylfluorene), 3-(2-Benzothiazolyl)-7-(diethylamino)coumarin, Triphenylamine, Phthalocyanine, Copper complex, and CuPe.

19. The display device according to claim 17, wherein the organic materials are selected from the group consisting of Pentacene; Antra[2",1",9";4,5,6,6",5",10";4',5',6']diisoquino[2,1a;2',1'a']-diperimidine12,25-dione; 3,4,9,10-perylenetetracarboxylic dianhydride (PTCDA; (6,6)-phenyl-C61butyric acid methyl ester; and N,N-Bis(2,5ditertbutylphenyl)3,4,9,10-perylenedicarboximide.

20. An electrophoretic display device, comprising:
a plurality of pixels, each pixel comprising:
a cell area containing a plurality of charged pigment particles;
two opposite electrodes configured to generate an electric field for controlling the charged pigment particles in the pixel; and
a semiconducting passivation layer disposed between electrode and cell area on at least one of the two opposite electrodes, Wherein the semiconducting passivation layer serves as a potential barrier for providing a high potential barrier resistance, wherein the potential barrier width is expressed as $$\chi_d = \left(\frac{2\varepsilon_s \phi_i}{qN_d}\right)^{1/2}$$

wherein $\in_x$ is a dielectric constant of semiconductor; $\phi_i$ is a built-in-potential of metal/semiconductor; $N_d$ is a doping concentration of semiconductor and q an electric charge, and the potential barrier width $\chi_d$ is adjusted by selecting material of the semiconducting passivation layer and/or controlling a doping concentration, wherein a charge transmission coefficient of tunneling through the potential barrier is expressed as $$T \propto e^{-2k_1 \chi_d}$$

where $\kappa_1$ is a wave vector.

* * * * *